J. GAYLEY.
METHOD OF OPERATING BLAST FURNACES AND CONVERTERS.
APPLICATION FILED MAY 13, 1909.
935,628.　　　　　　　　　　　　　　Patented Sept. 28, 1909.
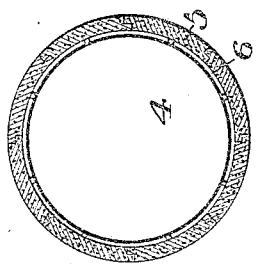
Fig.2.
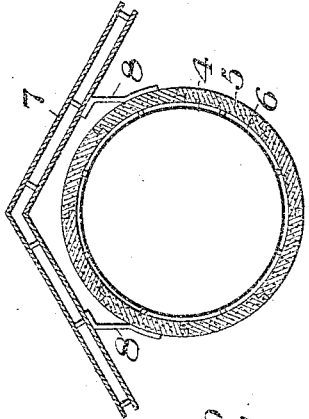
Fig.3.
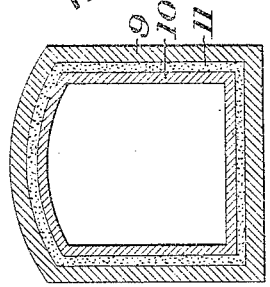
Fig.4.
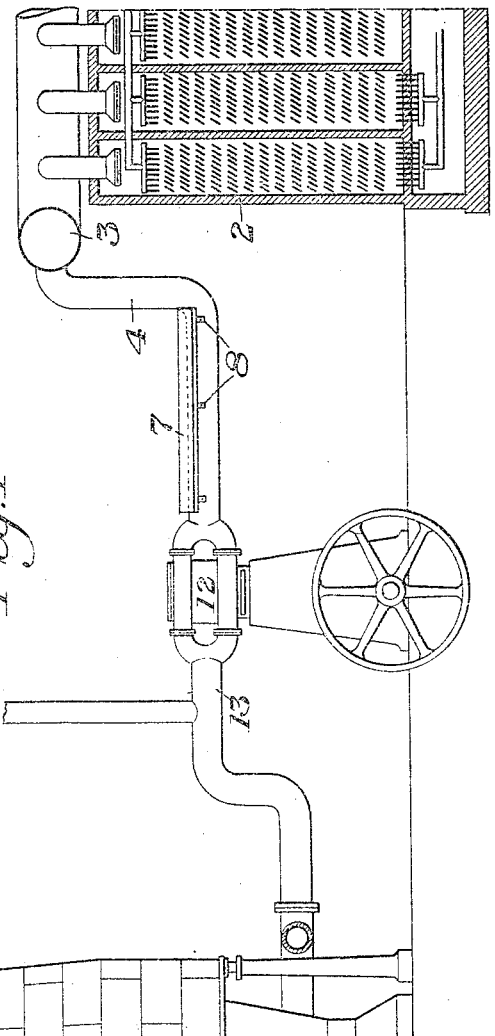
Fig.1.
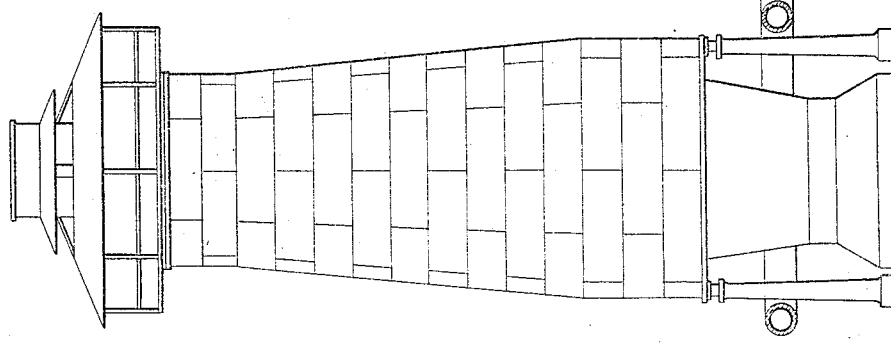
WITNESSES
R. H. Balderson
G. L. Winters
INVENTOR
James Gayley
by Bakewell, Byrnes & Parmelee
his Attys.

UNITED STATES PATENT OFFICE.

JAMES GAYLEY, OF NEW YORK, N. Y.

METHOD OF OPERATING BLAST-FURNACES AND CONVERTERS.

935,628.

Specification of Letters Patent. Patented Sept. 28, 1909.

Application filed May 13, 1909. Serial No. 495,656.

*To all whom it may concern:*

Be it known that I, JAMES GAYLEY, of the city of New York, county and State of New York, have invented a new and Improved Method of Operating Blast-Furnaces and Converters, of which the following is a full, clear, and exact description, reference being had to the accompanying drawings, forming part of this specification, in which—

Figure 1 is a sectional side elevation, showing one form of apparatus for carrying out my invention; Fig. 2 is a cross sectional view of a jacketed pipe which I may employ; Fig. 3 is a similar view, showing the jacketed pipe provided with a shield; and Fig. 4 is a cross sectional detail view of a form of underground conduit which I may use.

My invention relates to the operating of blast furnaces, converters, etc., and particularly to an improved method of supplying air thereto, with a small and substantially uniform moisture content.

Heretofore in forcing dried air to such apparatus the air drying apparatus has been constructed and operated with the sole purpose and effect of reducing the moisture in the air to a small and substantially uniform content, thus increasing the efficiency of the blast furnace or converter, and making its action more uniform and under better control. Uniformity of moisture content was the only feature sought for and obtained.

I have discovered that in order to give uniformity of process in the blast furnace, or converter it is of great importance that the air should not only have a substantially uniform moisture content, but should be of substantially uniform temperature, as it enters the blowing engine, in order that the blowing engine, and consequently the blast furnace or converter shall receive a supply of air which is not only uniform as regards its moisture content, but also uniform as to weight. The air is, of course, measured by the blowing engine as it passes through the blowing engine; and unless the air received by the blowing engine is uniform in temperature the blowing engine will deliver non-uniform weights of air, and consequently the metallurgical process will not be uniform. The blowing engine can only measure the air as to volume, while uniformity as to content of moisture, and as to weight, can only be obtained by treatment of the air before it is supplied to the blowing engine.

The dry blast systems which have been installed in plants previously constructed were so arranged that the blowing engines were in proximity to the blast furnaces; while the refrigerating apparatus or dry air plant has been placed at a considerable distance from the blowing engine, owing to its size, and the filling of the space near the furnace by various other buildings appurtenant to the furnace. In these plants, therefore, a long pipe or conduit extended from the air drying apparatus to the blowing engines; and it was not recognized that any disadvantage resulted. I have found, however, that this long pipe causes a considerable variation in the weight of the air fed to the blowing engines. These pipes or conduits have been made of comparatively thin sheet iron or steel, and as they are subjected to the heating rays of the sun by day and to air of a cooler temperature at night, the air passing through them reached the blowing engine at varying temperatures, and consequently varying weights per unit of volume. The amount of variation has varied according to atmospheric conditions, the length of the conduit pipe extending from the air drying apparatus of the blowing engines, and the extent of its exposure. As an example, it is found that the temperature of the air may vary during the day, or from day to day, from 10 to 20 degrees Fahrenheit; and a variation of 20 degrees would represent a variation of substantially 4 per cent. in the weight of the air; or in a modern type of blast furnace, a variation of about 150 pounds per minute.

The raw materials of the furnace are made as uniform as possible but the air consumed per ton of iron is 50 per cent. greater by weight than the raw material; and it is therefore important to deliver air to the furnace which is uniform in weight, as well as in moisture content per unit of volume. The variation in the weight of the air will increase or retard the rapidity of combustion of the fuel in the blast furnace, and thus cause a change in the fusion or combustion zone of the furnace. Such a change in this zone often causes the furnace charge to stick or hang on the walls, and these hanging portions, when dislodged, cool off the furnace hearth and interfere with the uniformity of furnace operation and the grade of metal produced. These disturbances, I have found to exist independently of the percentage of moisture in the air, since air of varying temperatures can, and often does, contain the same quantity of moisture. Air of varying temperatures, however, cannot contain the same weight per unit of volume; and the purpose of my present invention is to secure better uniformity in the metallurgical process by supplying air of substantially uniform temperature and therefore substantially uniform weight, as well as of substantially uniform moisture content, to the blowing engine, and hence to the furnace or metallurgical apparatus. In carrying out this discovery when air-drying apparatus is applied to existing plants, where the air-drying apparatus is remote from the blowing engine, I jacket or otherwise protect the air conduit leading from the air-drying apparatus to the blowing engine, in order to preserve a substantially uniform temperature of the air therein, and thus supply air of substantially uniform weight, as well as substantially uniform moisture content, to the blowing engine.

In the drawings, 2 represents a portion of a refrigerating and air-drying apparatus, which may be constructed in accordance with my previous patents, or in any other desirable way, the function of this apparatus being to reduce the moisture content of the air to a small and substantially uniform percentage. From this apparatus the dried air enters a pipe 3, whence it passes into the air conduit 4, leading to the blowing engine. The vertical portion of this pipe or conduit 4 is jacketed, for example as shown in Fig. 2. In this figure 5 represents insulating material forming a jacket around the pipe and spaced apart from the pipe to form an annular air space 6 between the pipe and the jacket.

Any horizontally extending portion of the pipe above ground is also preferably protected by a roof or shield 7, shown in Fig. 3, this roof or shield being double with an air space between. It may be supported on the conduit itself by brackets 8. If the conduit is under ground, it is preferably constructed as shown in Fig. 4, in which 9 is an outer wall, 10 the inner wall or conduit proper, and 11 a layer of insulating material between the two walls.

The blowing engine cylinders are represented at 12, 13 being the pipe leading from the blowing engines to the blast furnace or point of use. From this point on no protection is needed, as the air has already been measured. I do not desire to limit myself to any particular form of construction of conduits, as I consider myself first to discover the importance of delivering a uniform weight of air, as well as air having uniform moisture content, to the blowing engines which deliver it to the blast furnace or metallurgical apparatus.

The advantages of my invention will be obvious to those using such apparatus. The regularity of working is improved, the shifting of the combustion zone in blast furnaces largely prevented, and a more uniform grade of metal is produced.

Other means for preserving a substantially uniform temperature may be employed without departing from my invention. By the words "blast furnace or converter", I intend to cover metallurgical apparatus employing an air blast under pressure.

I claim:—

1. The method of operating blast furnaces or converters, using an air blast consisting in reducing the moisture content of the air to a small and substantially uniform percentage, supplying the dried air at a substantially uniform temperature and weight to blowing engines, and then forcing this air to the furnace or point of use; substantially as described.

2. The method of obtaining uniformity in the operation of blast furnaces and converters, consisting in supplying thereto air of a small and substantially uniform moisture content, and of a substantially uniform temperature and weight.

3. The method of supplying air to blast furnaces and converters, consisting in reducing the air to a low and substantially uniform temperature, reducing its moisture content to a small and substantially uniform percentage, maintaining the air thus treated at a substantially uniform temperature as it passes to the blowing engines, and then forcing said air to the blast furnace or converter.

4. In air supply apparatus for blast furnaces or converters, a refrigerating chamber, arranged to reduce the air to a low and substantially uniform temperature and to a low and substantially uniform moisture content, a blowing engine between the refrigerating chamber and the blast furnace or converter, and a conduit connecting the refrigerating chamber and the blowing engine and arranged to maintain a substantially uniform temperature of the air at the blowing engine.

5. The combination with a refrigerating chamber and a blowing engine, of a conduit connecting the same, and a conduit extending from the blowing engine to a blast furnace or converter, and means for insulating or protecting the conduit between the refrigerating chamber and the blowing engine, whereby air of a substantially uniform temperature and weight as well as of a substantially uniform low moisture content is supplied to the blowing engine.

In testimony whereof, I have hereunto set my hand.

JAMES GAYLEY.

Witnesses:
M. S. REED,
EUGENE H. MURPHY.